Sept. 17, 1957     M. L. YONKERS     2,806,662
HELICOPTER WITH TILTABLE LIFT ROTOR AND
COAXIAL COUNTER-TORQUE ROTOR
Filed March 5, 1954     2 Sheets-Sheet 1

INVENTOR.
Meredith L. Yonkers
BY
Martin E. Anderson
ATTORNEYS

Sept. 17, 1957  M. L. YONKERS  2,806,662
HELICOPTER WITH TILTABLE LIFT ROTOR AND
COAXIAL COUNTER-TORQUE ROTOR
Filed March 5, 1954  2 Sheets-Sheet 2
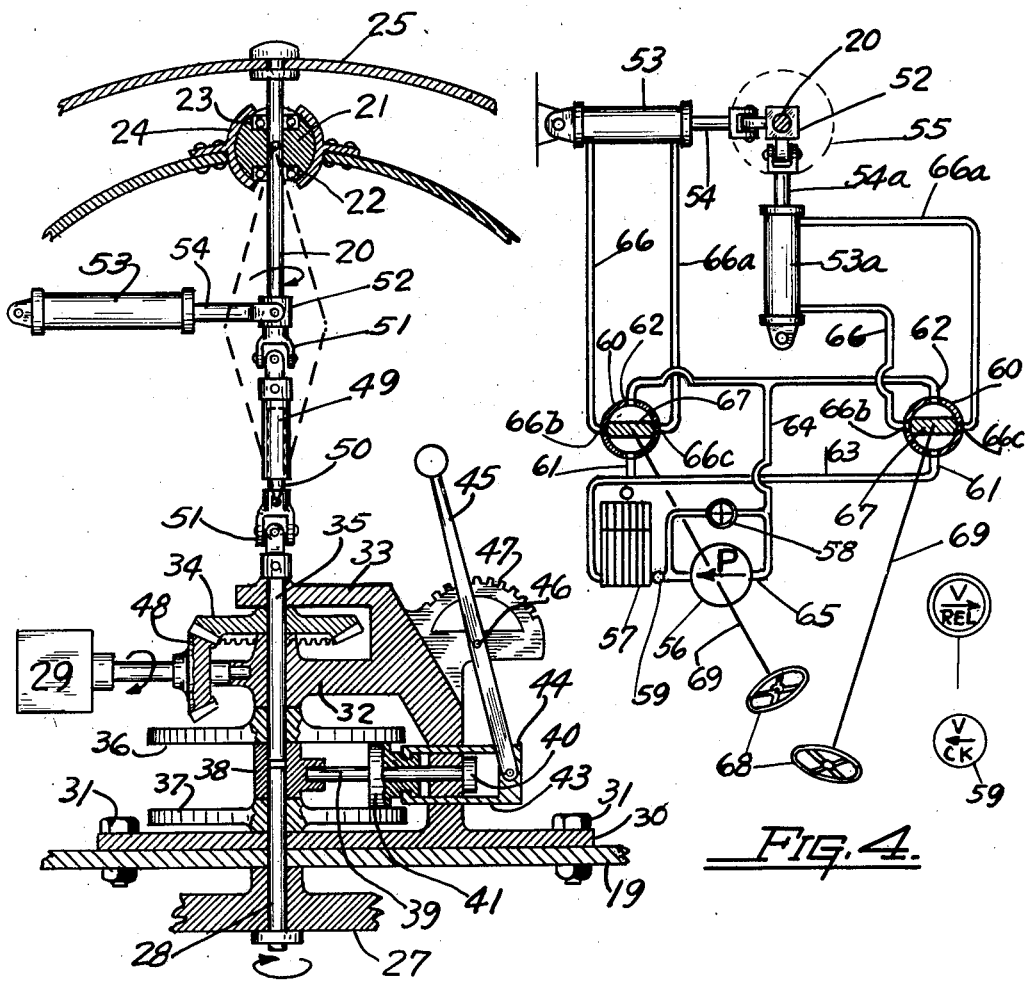
Fig. 3.
Fig. 4.
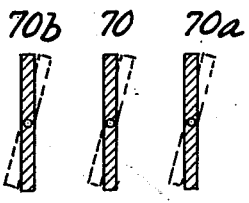
Fig. 5.
INVENTOR.
Meredith L. Yonkers
BY
Martin E. Anderson
ATTORNEYS 2,806,662
Patented Sept. 17, 1957

2,806,662

HELICOPTER WITH TILTABLE LIFT ROTOR AND COAXIAL COUNTER-TORQUE ROTOR

Meredith L. Yonkers, Denver, Colo.

Application March 5, 1954, Serial No. 414,280

4 Claims. (Cl. 244—17.19)

This invention relates to improvements in aircraft of the vertical rising type usually called helicopters.

There are today several specifically different forms of helicopters in use and others shown in patents and this invention therefore relates to various improvements.

Where an aircraft is provided with a single lifting propeller the torque applied to the propeller and which is provided by a suitable engine carried by the fuselage, produces a counter torque which tends to turn the fuselage about the propeller axis. Various means have been suggested for overcoming this objectionable characteristic, for example, double co-axial propellers turning in opposite directions, and a small counter torque propeller carried on the tail end of the fuselage, have been used. Where double propellers are used they have always been positioned above the fuselage.

It is the object of this invention to produce an aircraft of a distinctly different design that shall be of comparatively simple construction and which shall not require feathering propeller blades.

Another object is to produce an aircraft which shall have a substantially circular horizontal cross-section in which the lifting propeller shall have a fixed pitch and be rotatable about an axis that is tiltable relative to the fuselage so as to deliver a tractive force having a vertical or fuselage lifting component and another component parallel with the horizontal plane of the fuselage which serves to move the aircraft forwardly in the plane of said force triangle.

Another object is to produce an aircraft of the type specified, in which the propeller torque force is counterbalanced substantially in toto by a propeller located underneath the fuselage and to which air from the lifting propeller located on top of the aircraft fuselage is delivered.

A further object is to produce a steering and counter torque force by means of several blades extending rearwardly in spaced relation and mounted for simultaneous tilting movement about horizontal axes which blades are manually tiltable and serve to guide the aircraft in its travels; and a still further object is to produce an aircraft that can be quickly adjusted to move sidewise so as to avoid collision and to be maneuvered easily into any desired position above a stationary ground target or object.

The above and any other objects to which attention may be called or which may become apparent as the description proceeds, are attained by means of a consrtuction and an arrangement of parts that will now be described in detail, for which purpose reference will be had to the accompanying drawing in which the important features have been illustrated, and in which, Figure 1 is a top plan view of the aircraft;

Figure 3 is a view partly in section and partly in elevation showing one form of operating mechanism;

Figure 4 is a diagram showing one form of propeller tilting control; and

Figure 5 is a section taken on line 5—5, Figures 1 and 2.

Figure 1:
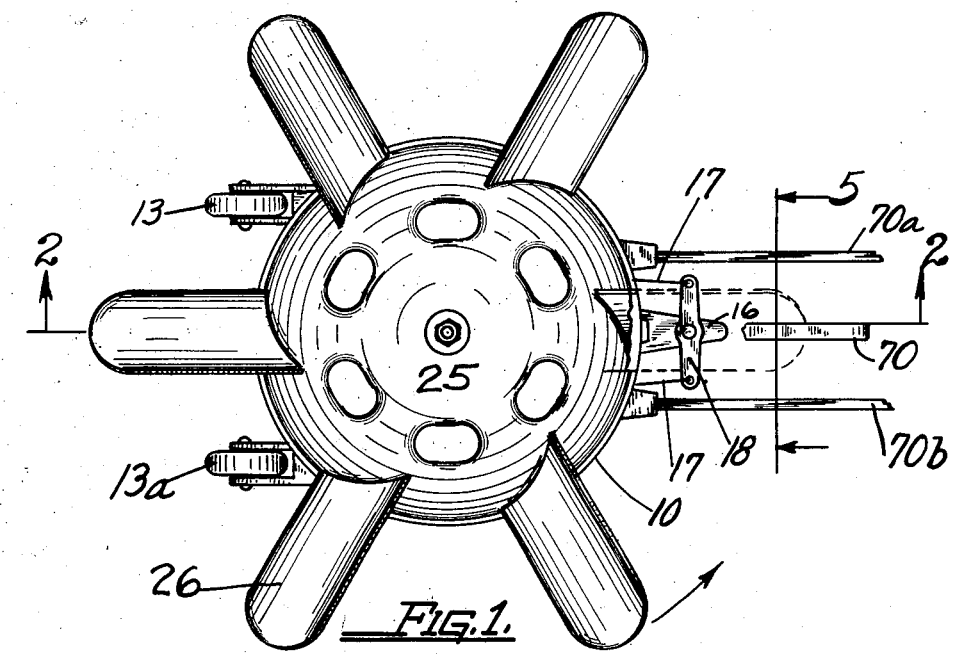

Since the drawing can show the aircraft to a very small scale only, no attempt will be made to show old and well understood parts in detail, and the description will therefore be restricted to a description of what is considered to be the novel features and to a general reference to such means as the specific control means for the engine, the wheel steering means and the means for operating the rudder vanes.

The fuselage when viewed from above has a circular outline as shown in Figure 1. The fuselage has been shown as comprising a substantially semi-spherical top 10 that is connected with the edge of the circular floor 11 by a frusto-conical wall 12. The device is supported by three wheels 13, 13a and 14 all of which are attached to frusto-conical wall 12 by suitable brackets. Wheel 14 is mounted in a fork 15 that in turn is mounted for limited rotation in bracket 16. Suitable means comprising cables 17 and a cross bar 18 is provided for steering wheel 14; which may also be given castor properties by the simple expedient of slanting fork 15 rearwardly. The engine and the transmission mechanism have been indicated in Figure 2 by a rectangle 19 and one form suitable for the purpose has been illustrated in Figure 3 and is intended to represent means broadly as it is evident that the desired function can be obtained by specifically different means.

Figure 2:
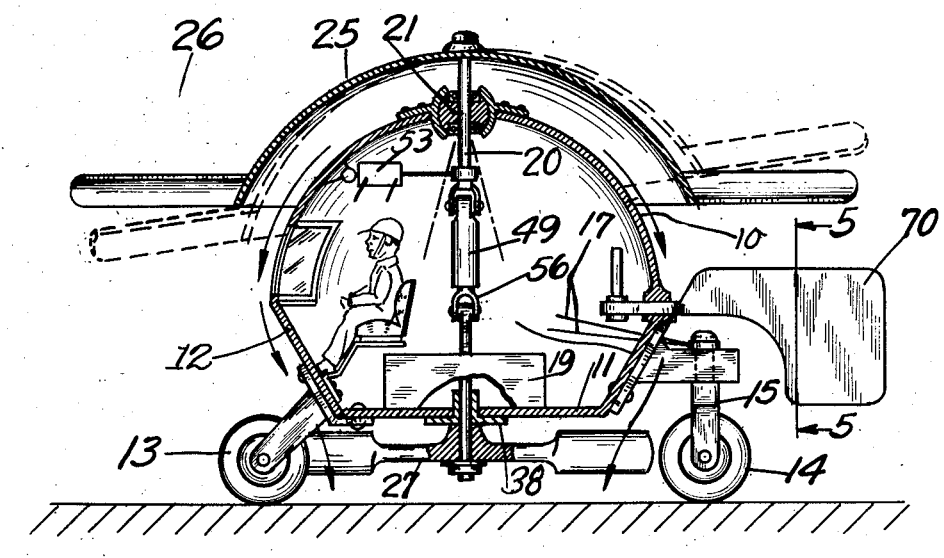
Figure 2 is a vertical diametrical section taken along line 2—2, Figure 1.

Referring now to Figure 3 it will be obesrved that propeller shaft 20 is mounted for rotation in a ball 21, suitable antifriction bearings 22 and 23 being provided. Ball 21 is mounted for limited movement in bearing 24. A propeller hub 25 of spherical shape is attached to the upper end of the propeller shaft and carries a plurality of angularly spaced propeller blades 26 as shown in Figures 1 and 2. A combined torque compensating and lifting propeller 27 is poistioned below the floor and is driven by propeller shaft 28. Numeral 29 designates an internal combustion engine that provides power for turning both of the propellers, which rotate in opposite directions and at the same or different speeds, as may be found to be necessary. In Figure 3 the propeller shafts are journaled in a steel casting having a base 30 fastened to the floor by bolts 31. The casting has two parallel arms 32 and 33 that are parallel with base 30. Arms 32 and 33 are spaced to provide room for a bevel gear 34 that is non-rotatably attached to the upper end of shaft 35 which shaft extends through lower arm 32 into the space between arm 32 and base 30. A friction gear disk 36 is splined to the lower end of shaft 35 and shaft 35 projects a short distance below the disk. Splined to shaft 28 is a friction gear disk 37. Shaft 28 extends a short distance above disk 37. A short bearing 38 encircles the ends of shafts 35 and 28 and is provided with a radial shaft 39 whose outer end is journaled in the frame and held from longitudinal movement by cap 40. A friction pinion 41 is mounted on shaft 39 for free rotary and sliding movement and has a grooved hub 42 that is engaged by the hooked ends of rods 43 which are joined at their outer ends by a bar 44. A lever 45 is pivoted to the frame at 46 and is movable along quadrant 47. Pinion 48 is rotated by power derived from the engine and as shown, turns propeller shaft 35 in the direction of the arrow. Disk 36 which is attached to the lower end of shaft 35 turns with the shaft and transmits motion through friction pinion 41 to disk 37 which will then turn in the opposite direction from disk 36. The lower end of propeller shaft 20 is operatively connected with the upper end of shaft 35 by means of an extensible shaft having two telescopic members 49 and 50 and two universal couplings 51. A bearing 52 surrounds the lower end of shaft 20 and this is connected to right angularly positioned hydraulic ram cylinders 53 and 53a by connecting rods 54 and 54a. It is possible to shift shaft 20 to any position along dotted line circle 55. When one of the hydraulic rams is held stationary in the position shown in Figure 4, the end of the shaft 20 can be moved in a substantially straight line across circle 55. It is evident that by means of the two devices the shaft can be tilted into any desired position.

In Figure 4 a means for tilting the shaft has been diagramatically shown. The pump designated by 56 may be the pump employed for forced lubrication or other purposes and the outlet port has been shown as connected with tank 57. The intake and outlet ports of the pump may be bridged by a conduit containing a pressure relief valve 58. A check valve 59 is positioned between the tank and the connection to the relief valve. Connected with each ram cylinder is a control valve 60 having an intake port 61 and an outlet port 62; the former is connected with the high pressure line 63 and the latter with the low pressure line 64 that connects with the intake port 65 of the pump. Pipes 66, 66a extend from the ends of cylinder 53 to ports 66b and 66c of the control valves. Each valve has a rotor 67 of such width or thickness that it covers ports 66b and 66a when it is in the position shown in the drawing. Rotors 67 may be turned by means of the hand wheels 68 that are connected to the rotors by shafts 69. When the rotors are in the position shown in the drawing, the pistons in cylinder 53 are held stationary in any desired position. When the rotors are turned so as to uncover the ports 66b and 66c oil can be made to flow into and out of selected ends of the cylinders and move the pistons. Since it is seldom that both of the adjustments are made at the same time, the fact that each movement is independently controlled presents no difficulty. It is possibel to replace the control device by some complicated modification of some form of steering device, but for applicant's purpose, the above described apparatus is believed to be sufficient.

It will be observed that three vanes 70, 70a and 70b have been provided at the rear of the fuselage; these have two functions: In the first place, they serve as counter torque devices; for example, when the lifting propeller operates and rotates the top lifting propeller in a counter-clockwise direction, the torque exerted by the propeller operating mechanism exerts an equal torque on the fuselage tending to rotate it clockwise. Propeller 27 which turns in the opposite direction to propeller 25, 26 can be adjusted as to speed by the speed changing device comprising plates 36, 37 and pinion 41. Any torque not compensated for by adjusting the speed of propeller 27 can be compensated for by tilting plates 70 as indicated in Figure 5. After the torque has been balanced the aircraft will move in the plane of the force triangle of propeller 25, 26. By tilting blades 70 in one direction or the other, the fuselage will turn and with it the plane of the force triangle and blades 70 therefore serve as a rudder. In case the direction of movement must be changed suddenly, the propeller shaft can be shifted by the other hydraulic ram and this turns the plane of the force triangle relative to the fuselage so that it will move angularly relative to direction in which the pilot is looking. The action of blades 26 produce a strong air current flowing downwardly along the outside of the semi-spherical shell and this current is sucked into propeller 27 as indicated by arrows in Figure 2.

The aircraft fuselage is quite large and the power plant and transmisison take up a comparatively small part of the floor space. Doors and windows can be provided of any desired size and in any position.

What I claim as new is:

1. An aircraft of the helicopter type comprising, a fuselage having a substantially semi-spherical top whose lower open end lies in a diametrical plane, a wheel supported floor positioned below the plane of the open end of the top, an annular wall section interconnecting the lower edge of the top with the edge of the floor, a lifting propeller attached to the uppermost point of the top for rotary and tiltable movement, a torque compensating and lifting propeller positioned below the floor and operatively connected thereto for rotation about an axis perpendicular to the plane of the floor, at least one engine supported by the floor, a transmission device operatively interconnecting the engine with both the lifting propeller and the torque compensating propeller, said device having a vertically extending propeller shaft having incorporated therein a two part telescopic section connected with the other two parts of the propeller shaft by universal joints, the transmission device having interposed in the connection between the engine and the torque compensating propeller a friction type speed reverser and speed changer, and hydraulic means connected with that portion of the lifting propeller drive shaft above the telescopic member, for tilting that portion of the shaft to change the direction of the force produced by the propeller relative to the vertical to form a vertical lifting component and also a horizontal component, tending to move the aircraft horizontally.

2. A device in accordance with claim 1 in which the fuselage is provided with at least one vane positioned to receive air from the slip stream of the upper propeller and means for tilting said vane about a horizontal radial axis to produce a torque force tending to turn the fuselage.

3. A device in accordance with claim 1 in which the means for tilting the upper propeller comprises two hydraulic ram devices positioned at right angles to each other and radially with respect to the vertical position of the propeller shaft, both of said devices being operatively connected with the top section of the propeller shaft, and means accessible to the pilot for selectively operating the said rams to tilt the shaft in any desired manner to turn the plane of the force triangle relative to the fuselage and therbey change the direction of aircraft travel.

4. A device in accordance with claim 1 in which the upper propeller has a spherically dished hub lapping the outside of the spherical top of the fuselage for an angular distance over 45 degrees at which point the blades extend radially.

References Cited in the file of this patent

UNITED STATES PATENTS

| 1,023,233 | Williams | Apr. 16, 1912 |
| 1,788,218 | Wettstein | Jan. 6, 1931 |
| 1,819,863 | Bleecker | Aug. 18, 1931 |
| 2,265,193 | Platt | Dec. 9, 1941 |
| 2,404,014 | Thornes | July 16, 1946 |
| 2,684,213 | Robert | July 20, 1954 |

FOREIGN PATENTS

| 377,789 | France | July 22, 1907 |
| 531,834 | Great Britain | Jan. 13, 1941 |